US012585114B2

(12) United States Patent    (10) Patent No.:  US 12,585,114 B2

Balzerson et al.    (45) Date of Patent:    Mar. 24, 2026

(54) METHOD AND SYSTEM FOR CALIBRATING A WEARABLE HEADS-UP DISPLAY INCLUDING INTEGRATED PRESCRIPTION LENSES TO PRODUCE ALIGNED AND COLOR CORRECTED IMAGES

(71) Applicant: GOOGLE LLC, Mountain View, CA (US)

(72) Inventors: Daniel David Albin Balzerson, Kitchener (CA); Brian Watson Cranton, Kitchener (CA); Qianli Ma, Cambridge (CA); Haven John David Szostak, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 1000 days.

(21) Appl. No.: 17/408,955

(22) Filed: Aug. 23, 2021

(65) Prior Publication Data

US 2022/0373802 A1    Nov. 24, 2022

Related U.S. Application Data

(60) Provisional application No. 63/190,158, filed on May 18, 2021.

(51) Int. Cl.
*G02B 27/00* (2006.01)
*G02B 3/14* (2006.01)
*G02B 27/01* (2006.01)

(52) U.S. Cl.
CPC ........... *G02B 27/0172* (2013.01); *G02B 3/14* (2013.01); *G02B 2027/011* (2013.01);
(Continued)

(58) Field of Classification Search
CPC  G02B 27/0172; G02B 3/14; G02B 2027/011;
G02B 2027/013;
(Continued)

(56) References Cited

U.S. PATENT DOCUMENTS

| 5,731,902 A | 3/1998 | Williams et al. |
| 10,043,430 B1 | 8/2018 | D'Amico et al. |
| | (Continued) | |

FOREIGN PATENT DOCUMENTS

| JP | 2002082305 A | 3/2002 |
| WO | 2021021155 A1 | 2/2021 |

OTHER PUBLICATIONS

"Phoropter", Wikipedia, https://en.wikipedia.org/wiki/Phoropter, Aug. 6, 2021, 3 pages.
(Continued)

*Primary Examiner* — Henry Duong

(57) ABSTRACT

A system and method of calibrating a head-mounted display (HMD) by positioning an optical combiner of the HMD into a holder of a calibration station such that the optical combiner is in a primary optical path of light provided from a micro-display of the HMD and a camera of the calibration station, adjusting a tunable correction unit to correct defocus caused by a corrective prescription of the optical combiner, capturing images of a reference target by the camera as viewed through the tunable correction unit and optical combiner, and generating a distortion model from the captured images and calibrating the HMD in order to apply the distortion model to images projected by the HMD.

20 Claims, 4 Drawing Sheets

(52) U.S. Cl.
CPC .................. *G02B 2027/013* (2013.01); *G02B 2027/0138* (2013.01); *G02B 2027/0178* (2013.01); *G02B 2027/0187* (2013.01)

(58) Field of Classification Search
CPC .... G02B 2027/0138; G02B 2027/0178; G02B 2027/0187; G02B 27/0176; G02B 2027/0181; G02B 27/01; G02B 27/0101; G02B 27/0103; G02B 27/0149; G02B 27/017; G02B 27/0179; G02B 27/0189; G02B 2027/0105; G02B 2027/0107; G02B 2027/0109; G02B 2027/0112; G02B 2027/0114; G02B 2027/0116; G02B 2027/0118; G02B 2027/012; G02B 2027/0121; G02B 2027/0123; G02B 2027/0125; G02B 2027/0127; G02B 2027/0129; G02B 2027/0132; G02B 2027/0134; G02B 2027/0136; G02B 2027/014; G02B 2027/0141; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0174; G02B 2027/0183; G02B 2027/0185; G02B 2027/019; G02B 2027/0194; G02B 2027/0192; G02B 2027/0196; G02B 2027/0198
USPC ........................................................ 359/630
See application file for complete search history.

(56) References Cited

U.S. PATENT DOCUMENTS

| | | | | |
|---|---|---|---|---|
| 11,480,467 | B2 * | 10/2022 | Kaehler | ................. G01N 21/27 |
| 12,079,993 | B1 * | 9/2024 | Lochner | ................. G16H 30/40 |
| 2014/0285429 | A1 * | 9/2014 | Simmons | ........... G02B 27/0179 |
| | | | | 359/259 |
| 2020/0058266 | A1 | 2/2020 | Fu et al. | |
| 2020/0073119 | A1 | 3/2020 | Urquhart et al. | |
| 2020/0169725 | A1 | 5/2020 | Hua et al. | |
| 2024/0103301 | A1 | 3/2024 | Chan et al. | |

OTHER PUBLICATIONS

International Search Report and Written Opinion mailed Aug. 23, 2022 for PCT Application No. PCT/US2022/0295967, 16 pages.
International Preliminary Report on Patentability mailed Nov. 30, 2023 for PCT Application No. PCT/US2022/029597, 10 pages.
Translation of Japanese Office Action mailed Jul. 15, 2025 for JP Application No. 2023571620, 6 pages.

* cited by examiner

METHOD AND SYSTEM FOR CALIBRATING A WEARABLE HEADS-UP DISPLAY INCLUDING INTEGRATED PRESCRIPTION LENSES TO PRODUCE ALIGNED AND COLOR CORRECTED IMAGES

BACKGROUND

In the field of optics, a combiner is an optical apparatus that combines two light sources, for example, light transmitted from a micro-display and directed to the combiner via a lightguide, and environmental light. Optical combiners are used in heads up displays (HUDs), examples of which include head-mounted displays (HMDs) or near-eye displays, which allow a user to view computer-generated content (e.g., text, images, or video content) superimposed over a user's environment viewed through the HMD, creating what is known as augmented reality (AR) or mixed reality (MR). In some applications, an HMD is implemented in an eyeglass frame form factor with an optical combiner forming at least one of the lenses within the eyeglass frame. The HMD enables a user to view the displayed computer-generated content while still viewing their environment.

To ensure that a user will see the computer-generated content in focus and with minimal distortion and chromatic aberrations, components of the HMD are generally calibrated using images captured by a test set-up camera that is positioned where the user's eye is expected to be located when the user is wearing the HMD. These images simulate what the user is likely to see projected from the UN/ID, as well as the real-world environment as viewed through the optical combiner of an AR or MR HMD.

BRIEF DESCRIPTION OF THE DRAWINGS

The present disclosure can be understood, and its numerous features and advantages made apparent to those skilled in the art, by referencing the accompanying drawings. The use of the same reference symbols in different drawings indicates similar or identical items.

DETAILED DESCRIPTION

Figure 1:
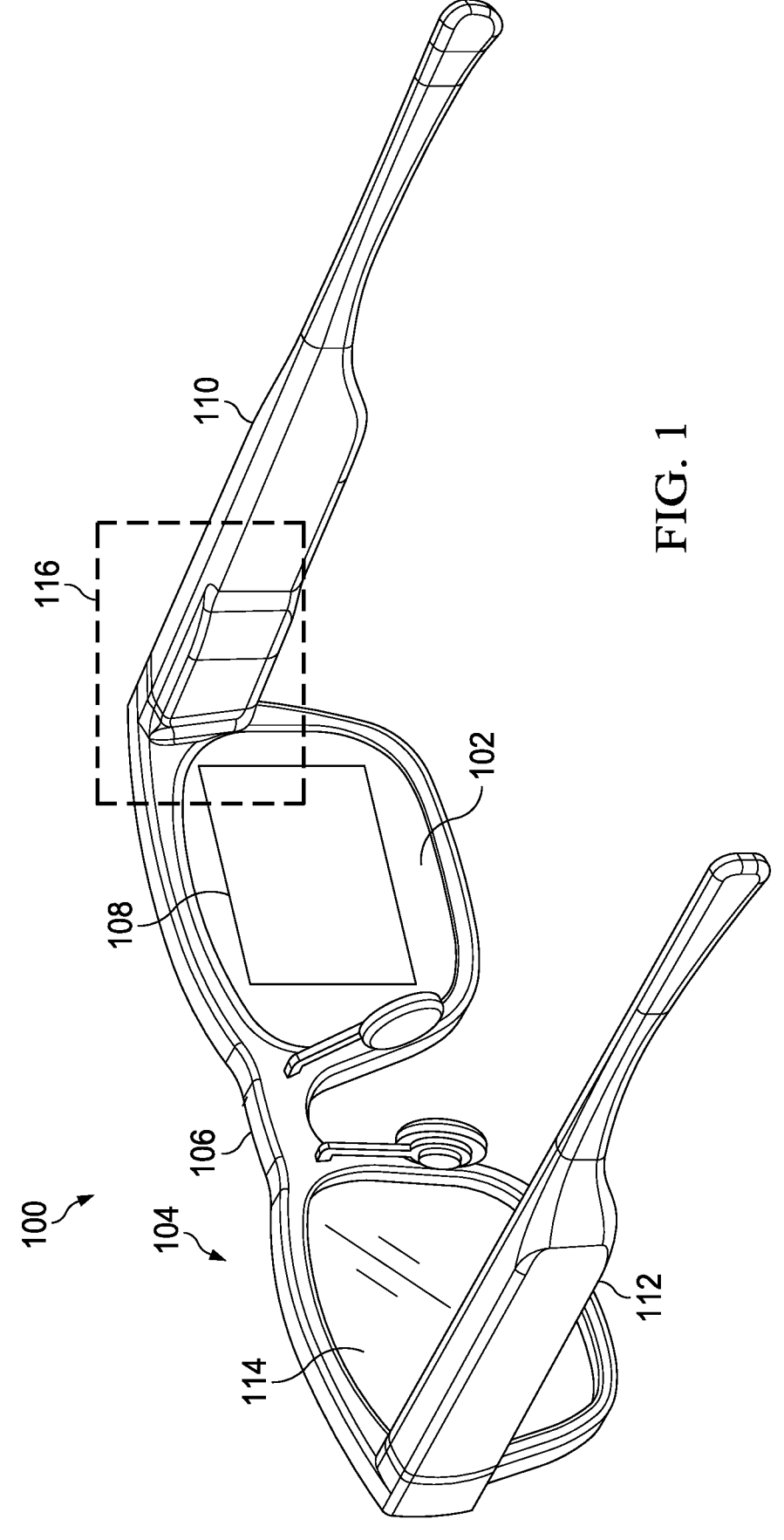
FIG. 1 illustrates an example head-mounted display (HMD) having an optical combiner with an integrated corrective prescription in accordance with some embodiments.

Conventional near-eye displays sometimes require ophthalmic corrective lenses to accomodate those user's that require eyesight correction. Typical methods for including a corrective optical prescription in an HMD require configuring the HMD's optical combiner to accommodate both a lightguide and a separate prescription lens, either as part of eyeglasses worn by the user or as a lens that is inserted into, or attached to, the optical combiner. The result is often a bulky system that can be uncomfortable for a user to wear, thus detracting from the user experience. Further, boundary lines of a corrective prescription lens included in a combiner as an insert or attachment are often visible to the user, which also detracts from the user experience. To avoid these issues, optical combiners with integrated corrective prescriptions have been developed. Although there are complications in simultaneously correcting both the light from within the combiner and the environmental light such that a user does not experience undesirable optical aberrations or distortions when viewing an augmented reality scene, these complications can be diagnosed and ameliorated by calibrating the micro-display so that the device provides good visual acuity for the user.

However, the introduction of a corrective prescription into an optical combiner of an HMD presents challenges to calibrating an HMD because, in some cases, the corrective prescription introduces both defocus and distortion into images projected by the micro-display and light from the environment transmitted through the optical combiner. To avoid such aberrations, it is desirable that, during a calibration process, the environment and displayed content be viewed as through a user's eye in order to calibrate the micro-display. Thus, using the techniques described herein, components of a calibration system used to perform calibration of displayed content viewed through a prescription lens are configured to simulate the user's eye that is in need of refractive correction. In contrast, existing calibration systems assume the user has good eyesight during calibration and the device to be calibrated can either use architectures that do not require corrective prescriptions to be applied to the display or assume that modular corrective prescription can be added to the HMD post-calibration. Because users' corrective prescriptions vary significantly, it is desirable that a single calibration system be adjustable to support a wide range of user prescriptions.

FIGS. 1-5 illustrate systems and methods for inspecting and calibrating an HMD having at least one optical combiner with an integrated user-specific corrective prescription. The output of the micro-display of the HMD and a reference target, as viewed through the optical combiner having a corrective prescription, are measured at a specialized calibration station to calibrate for optical aberrations and artifacts caused by the corrective prescription. The calibration station includes a camera and at least one tunable corrective unit, which together mimic the user's eye that is in need of refractive correction. That is, the camera sensor of the camera mimics the retina of a user's eye to receive light in order to "see" an image and the tunable corrective unit mimics the lens of a user's eye to focus light such that the image is seen as in-focus by the camera sensor. In general, the tunable corrective unit compensates for the shift in focal point caused by the corrective prescription of the optical combiner and allows the camera of the calibration station to capture the sharp images required to perform measurement and calibration of the HMD. Calibration of the HMD is comparative such that the micro-display of the HMD is calibrated to match the reference target, both of which are optically modified by the corrective prescription of the optical combiner and the tunable corrective unit. In other words, the optically modified light from the micro-display of the HMD is matched to the optically modified light from the reference target so that a user of the HMD will see content displayed at the optical combiner and the environment beyond the optical combiner with good visual acuity.

The tunable correction unit can be adjusted manually by an operator or by an automatic process to create a focused image at the camera during a calibration stage of the production process or as part of the re-calibration of an HMD in need of repair(s). Because components of the tunable correction unit can be adjusted, the calibration station can simulate a number of different corrective prescriptions and allow simulation of how various users would see the real-world and/or displayed content when wearing an HMD configured with their specific prescription.

FIG. 1 illustrates an example HMD 100 employing an optical combiner 102 having an integrated corrective prescription. The HMD 100 has a support structure 104 that includes a frame 106, which houses a micro-display (shown in FIG. 2), such as a laser projector or light-emitting diode (LED) display, that generates visible light in order to project images toward the eye of a user via the optical combiner 102, such that the user perceives the projected images as being displayed in a field of view (FOV) area 108 at the combiner 102. In some embodiments, the micro-display also generates infrared light for eye tracking purposes.

Support structure 104 also includes components to allow the support structure 104 to be worn in a position in front of a user's eyes. Examples of such components are arms 110 and 112 to be supported by a user's ears. A strap, or straps (not shown), configured to be worn around and/or on top of a user's head may be used in place of one or more of the arms in some embodiments to secure the support structure 104 in front of a user's eyes. In some embodiments, the HMD 100 is symmetrically configured such that lens element 114 is also a combiner and a micro-display is housed in the portion of the frame 106 proximate to arm 112 to project images to a FOV area within lens element 114. Either or both of combiner 102 and lens element 114 can be configured with eye-side and world-side surfaces having curvatures that, together, provide prescription correction of light that is transmitted to a user's eye(s).

In the depicted example, the HMD 100 is a near-eye display system in which the support structure 104 is configured to be worn on the head of a user and has a general shape and appearance (or "form factor") of an eyeglasses frame. The support structure 104 contains or otherwise includes various components to facilitate the projection of such images toward the eye of the user, such as a processing system described in greater detail below with reference to FIG. 3. In some embodiments, the support structure 104 further includes various sensors, such as one or more front-facing cameras, rear-facing cameras, other light sensors, motion sensors, accelerometers, and the like. The support structure 104 further can include one or more radio frequency (RF) interfaces or other wireless interfaces, such as a Bluetooth™ interface, a WiFi interface, and the like. Further, in some embodiments, the support structure 104 includes one or more batteries or other portable power sources for supplying power to the electrical and processing components, such as one or more processors of a processing system of the HMD 100. In some embodiments, some or all of these components of the HMD 100 are fully or partially contained within an inner volume of support structure 104, such as within arm 110 and the portion of the frame 106 in region 116 of the support structure 104. It should be noted that while an example form factor is depicted, it will be appreciated that in other embodiments the HMD 100 may have a different shape and appearance from the eyeglasses frame depicted in FIG. 1.

In the depicted embodiment, combiner 102 of the HMD 100 provides an AR display in which rendered graphical content can be superimposed over or otherwise provided in conjunction with a real-world view as viewed by the user through combiner 102. For example, light used to form a perceptible image or series of images may be projected by a micro-display of the HMD 100 onto the eye of the user via a series of optical elements, such as a lightguide formed at least partially in combiner 102 and one or more lenses and/or filters disposed between the micro-display and the lightguide. Optical combiner 102 includes at least a portion of a lightguide that routes display light received by an incoupler of the lightguide to an outcoupler of the lightguide, which outputs the display light toward an eye of a user of the HMD 100. In addition, optical combiner 102 is sufficiently transparent to allow a user to see through combiner 102 to provide a field of view of the user's real-world environment such that the image appears superimposed over at least a portion of the user's real-world environment. In order to ensure that a user sees their real-world environment and the images projected from the optical combiner 102 in-focus, in the correct angular position, and with minimal undesirable distortion, components of the HMD, including the micro-display are tuned using a calibration station, an example of which is described in greater detail in below with reference to FIG. 2.

Figure 2:
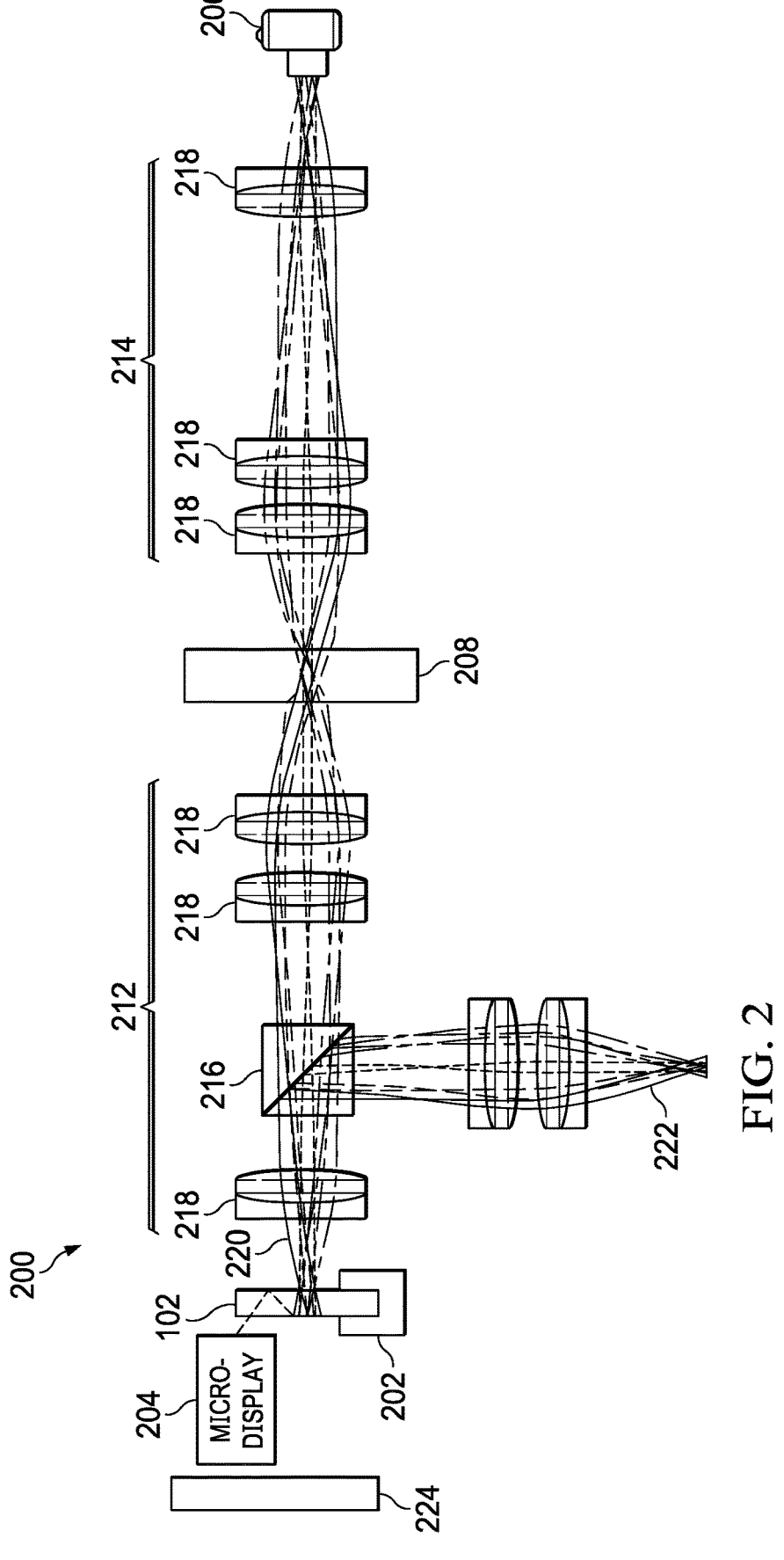
FIG. 2 shows a block diagram of a calibration station in which aspects of an HMD, such as the HMD of FIG. 1, are measured and calibrated in accordance with some embodiments.

FIG. 2 shows a block diagram of a calibration station 200 in which aspects of a display system, such as HMD 100, are measured and calibrated. The calibration station 200 includes a holder 202 into which an optical combiner, such as optical combiner 102, is placed. The position of the holder 202 is adjustable to allow the optical combiner 102 to be positioned in a primary optical path of light 220 traveling from a micro-display 204 associated with the optical combiner 102 to a camera 206 of the calibration station 200. Although depicted as a single component for ease of illustration, the camera 206 is a combination of a camera sensor for sensing light and a camera lens, or combination of lenses, for focusing light on the camera sensor.

A tunable correction unit 208 is also disposed in the primary optical path and located between holder 202 and camera 206. In some embodiments, the tunable correction unit 208 is a phoropter including a variety of lenses, including, but not limited to, spherical lenses, cylindrical lenses, filtered lenses, and prismatic lenses. The phoropter, in some embodiments, also includes specialized measurement devices, such as Maddox rods and a Jackson cross-cylinder. In some embodiments, the tunable correction unit 208 is a focus tunable lens, such as a fluid-filled shape-changing lens in which the radius of the lens can be changed by deforming a membrane housing the fluid or by pumping the fluid into or out of the membrane. In some embodiments, the tunable correction unit 208 is a trial lens kit including a variety of spherical concave lenses, spherical convex lenses, cylindrical concave lenses, cylindrical convex lenses, prismatical lenses, and specialized lenses such as colored lenses, an occluder lens, pin hole lenses, and cross cylinder lenses which can be placed in the optical path between the holder 202 and camera 206. In some embodiments, a neutral-density (ND) filter is positioned between camera 206 and tunable correction unit 208 to reduce or modify the intensity of the light that enters the camera 206 to avoid capturing images that are too bright or "overexposed".

In order to calibrate the HMD 100 so that the user views focused images or text of uniform color and brightness across the FOV 108 of the optical combiner 102, distortion caused by the optical combiner 102 is corrected by the tunable correction unit 208. Particularly when the optical combiner 102 includes an integrated corrective prescription based on a user's specific optical correction needs, the tunable correction unit 208 is used to reverse the blurriness caused by the corrective prescription so that camera 206 of the calibration station 200 can capture a sharp, in-focus image on which to perform display measurement and calibration.

To illustrate, the corrective prescription of the optical combiner 102 works in conjunction with the lens and cornea of a user's eye to focus light on the retina of the eye. Vision problems occur when the focus accommodation of the eye cannot bring an object into focus or when the eye is not symmetric and suffers from astigmatism. The corrective prescription of the optical combiner 102 (measured in diopters) changes the focal point of light entering the user's eye such that the light is correctly focused on the retina, allowing the user to view their environment in focus. Thus, a corrective prescription is integrated into the optical combiner 102 by shaping the optical combiner 102 to shift the perceived depth of the real world into a common plane, in the case of astigmatism correction, and into a plane that falls within the patient's focus accommodation, in the case of spherical correction. Because the degree to which the focal point is shifted varies on a user's specific corrective prescription, images viewed through an optical combiner 102 with an integrated prescription will appear blurry or out-of-focus to another user or, in the case of the calibration station 200, to the camera 206. Thus, the lenses or the shape of the tunable correction unit 208 is adjusted to reverse the shift in focal point imposed by the optical combiner 102 having a corrective prescription such that the light is correctly focused at the camera 206 and the camera 206 can capture an in-focus image of the environment viewed through the tunable correction unit 208 and optical combiner 102.

In some embodiments, the calibration station 200 includes at least one optical relay. The example calibration station 200 shown in FIG. 2 includes two optical relays 212, 214. The first optical relay 212 is disposed between the holder 202 and the tunable correction unit 208 and the second optical relay 214 is disposed between the tunable correction unit 208 and the camera 206. The first optical relay 212 has at least a first set of relay lenses 218 to relay light from the micro-display 204 to the tunable correction unit 208 and the second optical relay 214 has at least a second set of relay lenses 218 to relay light from the tunable correction unit 208 to the camera 206. Because camera 206 is used to simulate the view of the user, without at least one optical relay, the camera 206 would need to be placed very close to the optical combiner 102 being held in the holder 202 in order to emulate the position of the user's eye. Consequently, there would not be enough space to fit a tunable correction unit 208 between the holder 202 and the camera 206. The optical relays 212, 214 serve to elongate the primary optical path to accommodate positioning of the tunable correction unit 208 between the camera 206 and the holder 202 and to allow the camera 206 to capture images of digital content projected at the optical combiner 102 and/or a reference target 224 located beyond the optical combiner 102 as a user would see the digital content and reference target 224. In some embodiments, the reference target 224 is positioned at a set distance from the holder 202 such that camera 206 views the reference target 224 through the optical combiner 102 positioned in the holder 202. The reference target 224 is generally a physical item or image, such as a checkerboard grid or other pattern having distinguishable features, that is used to ensure the camera 206 is capturing a focused image of the reference target 224. In some embodiments, the reference target 224 is a static or dynamic image that is projected onto a surface positioned a set distance from the holder. While the reference target 224 is generally illuminated with white light, colored lighting can also be used to illuminate the reference target 224.

In order to sample a portion of the light 220 from the micro-display 204 to calibrate color, intensity, and intensity uniformity, a beam splitter 216 is positioned between the micro-display 204 and the tunable correction unit 208. The beam splitter 216 redirects a portion of the light 220 from the micro-display 204 away from the primary optical path towards measurement devices, such as a spectrometer, power meter, and/or integrating sphere as described in greater detail below with reference to FIG. 3. In some embodiments, the beam splitter 216 is used to inject light into the primary optical path. In some embodiments, the beam splitter 216 is positioned between the tunable correction unit 208 and the camera to partially compensate for the impact of the tunable correction unit 208 on the light from the micro-display 204. In some embodiments, a beam splitter 216 is positioned on either side of the tunable correction unit 208 to fully compensate for the impact of the tunable correction unit 208.

Figure 3:
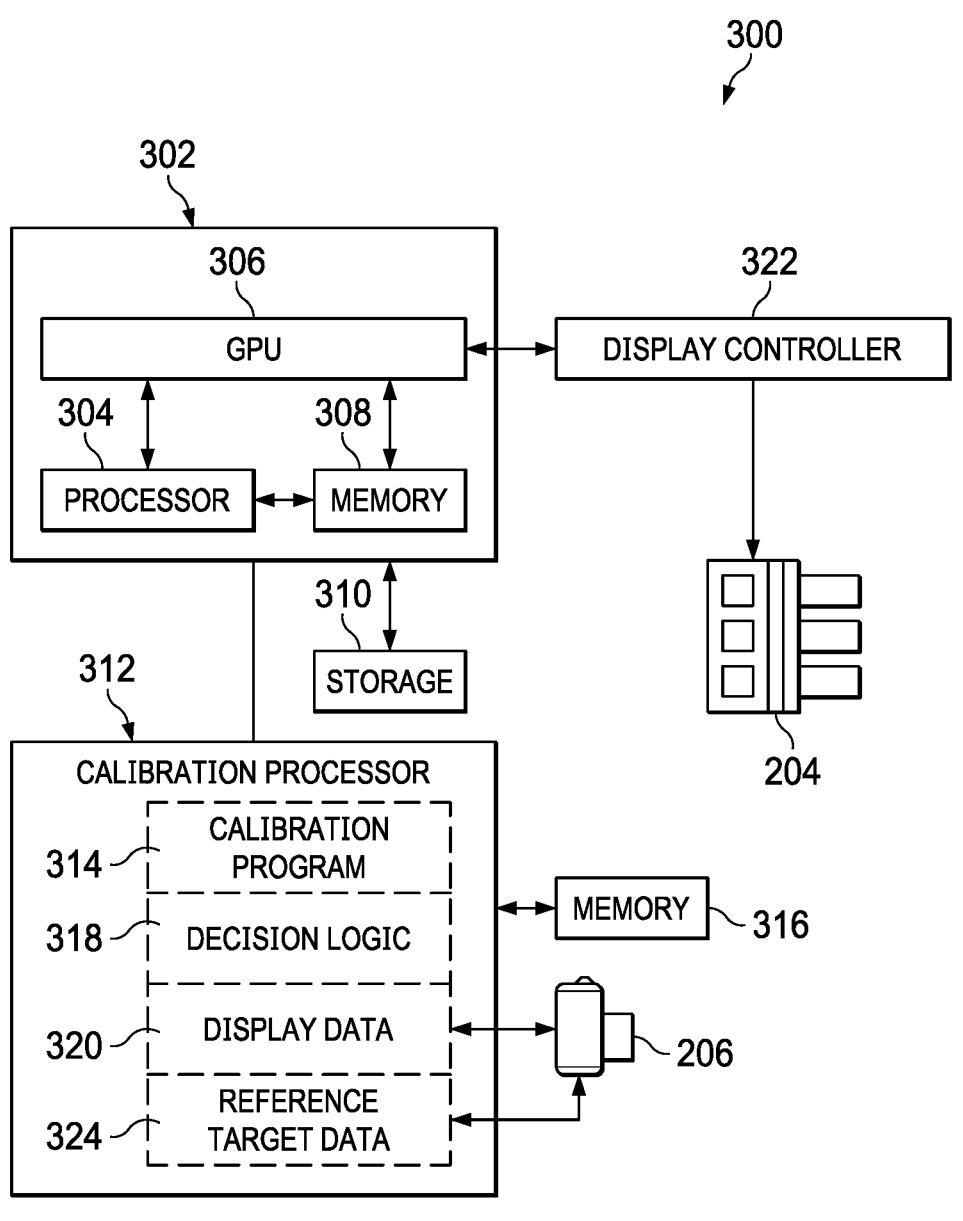
FIG. 3 shows a block diagram of processing systems associated with a micro-display of the HMD of FIG. 1 and the calibration station of FIG. 2 in accordance with some embodiments.

FIG. 3 shows a block diagram of a processing system 300 associated with the micro-display 204 of the HMD and the calibration station 200. In the illustrated example, the processing system 300 includes an application processor (AP) 302, which is an integrated circuit (e.g., a microprocessor) that runs one or more software programs to control the micro-display 204 and other components of the HMD 100. In the example shown in FIG. 3, AP 302 includes a processor 304, GPU 306, and memory 308. Processor 304 and GPU 306 are communicatively coupled to memory 308. In some embodiments, the memory 308 is configured as temporary storage to hold data and instructions that can be accessed quickly by processor 304 and GPU 306. In some embodiments, storage 310 is a more permanent storage to hold data and instructions. Each of memory 308 and storage 310 are non-transitory processor-readable storage media that store data and instructions and can include one or more of random-access memory (RAM), read-only memory (ROM), flash memory, solid state drive, or other processor-readable storage medium. In some embodiments, processor 304 is a programmed computer that performs computational operations. For example, processor 304 is implemented as a central processing unit (CPU), a microprocessor, a controller, an application specific integrated circuit (ASIC), system on chip (SOC), or a field-programmable gate array (FPGA).

To form a virtual image at the field of view (FOV) area 108 to be viewed by a user of the HMD 100, GPU 306 receives source images from processor 304 and writes or renders the source images into a projector frame buffer, which is transmitted to display controller 322 of the micro-display 204. In order to project the source images to the optical combiner 102, micro-display 204 uses the frame buffer data to generate drive controls for laser diodes or other light sources in the micro-display 204. During the normal operation of HMD 100, any corrections to the source images to be projected to optical combiner 102 are applied when rendering the source images into the projector frame buffer. In some embodiments, the display controller 322 applies the corrections prior to providing the frame buffer data to the micro-display 204. Several corrections, such as geometric distortions (determined by the calibration process described herein), color correction, and/or other corrections due to physical changes (e.g., thermal changes) in the optical system, are applied to the source images to achieve a corrected image that is displayed to a user.

For example, an HMD employing a micro-display 204 having laser diodes that each project a different wavelength of light produces virtual images at the FOV 108 by projecting multiple source images from different regions of the projector frame buffer. The HMD is designed such that the virtual images overlap in the FOV 108 to be viewed as one image. However, it is sometimes the case that the HMD as manufactured does not automatically produce virtual images that are aligned in the FOV 108, which can result in a user seeing the images as out-of-focus or as "ghost" images (i.e., slightly offset, overlapping images). Even after optics in the system have been precisely aligned, there may still be misalignments in the virtual images projected at the FOV 108 due to the unique path and unique nonlinear distortion that produced each virtual image. Thus, distortion models are applied to source images such that when the source images are distorted ("corrected") and projected to the FOV 108, the distorted source images form virtual images that are aligned in a target region(s) of the FOV 108. Similarly, color correction and/or intensity models can be applied to the source images. These models vary the distribution of colors and brightness within certain regions of the source images such that, when projected at the FOV 108, the resulting virtual images have uniform color and brightness as viewed by the user.

Figure 4:
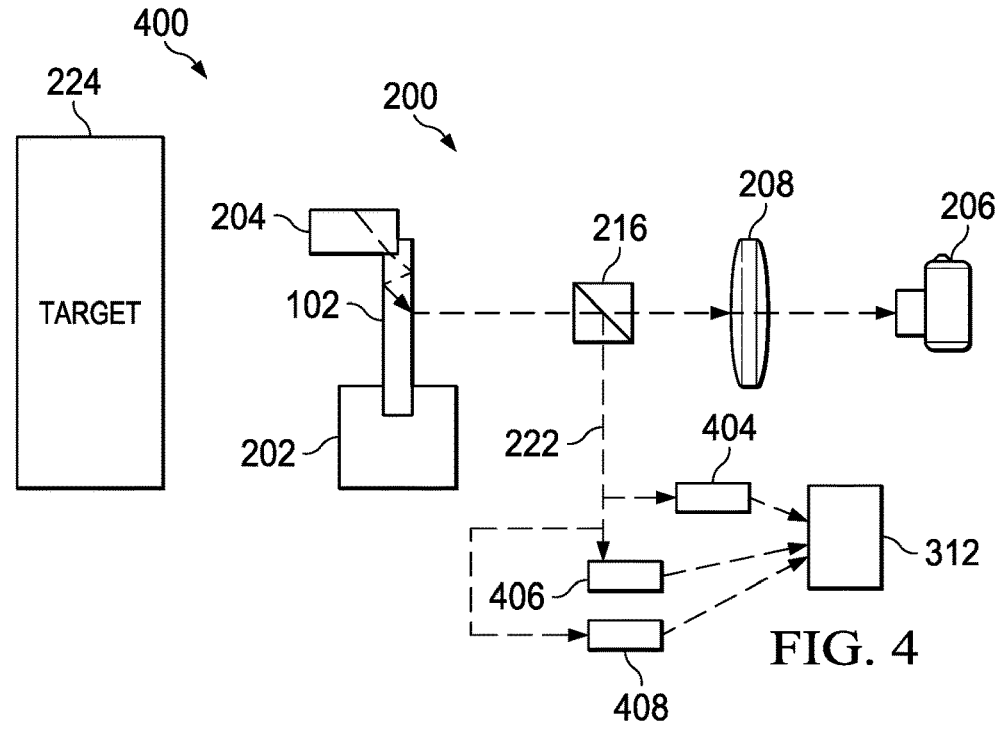
FIG. 4 shows a block diagram of a calibration system including the calibration station of FIG. 2 and peripheral devices in accordance with some embodiments.

The processing system 300 further includes a calibration processor 312, which is communicatively coupled to camera 206 in order to receive images and/or light intensity data captured by camera 206 during the calibration process, as explained further with reference to FIG. 4. In some embodiments, the calibration processor can be decoupled from the HMD 100 once calibration is complete. In general, a processor that executes a calibration process as described herein may be referred to as a calibration processor. In some embodiments, calibration processor 312 is a programmed computer that performs computational operations. For example, calibration processor 312 can be a central processing unit (CPU), a microprocessor, a controller, an application specific integrated circuit (ASIC), system on chip (SOC), or a field-programmable gate array (FPGA). Although not shown, a display screen may be communicatively coupled to calibration processor 312 to allow interaction with a calibration program 314 running on calibration processor 312 and/or to allow calibration processor 312 to display calibration results from the calibration program 314.

In some embodiments, the calibration processor 312 is communicatively coupled to AP processor 302 for calibration purposes. In FIG. 3, calibration processor 312 is shown executing instructions of calibration program 314. Calibration program 314 may be stored in memory 316 and accessed by calibration processor 312 at run time. Calibration program 314 includes decision logic 318, which when executed by calibration processor 312, in some embodiments, provides test patterns in a defined sequence to AP 302. The defined sequence may be adjusted during the calibration process. AP 302 renders the test patterns in the defined sequence into the projector frame buffer. Camera 206 captures images of the test patterns as the test patterns are projected by micro-display 204 by way of the optical combiner 102 and generates display data 320. Camera 206 also captures images of reference target 224, as viewed through the optical combiner 102 and the tunable correction unit 208, and generates reference target data 324. Calibration processor 312 receives display data 320 and reference target data 324 from camera 206 and the calibration program 314 uses the display data 320 and reference target data 324 to determine eye space to projector space mappings that are subsequently used to generate warped or distorted source images. In some embodiments, spectrum and intensity measurements of the test patterns projected by micro-display 204 are taken by peripheral components, such as those described in greater detail with reference to FIG. 4.

FIG. 4 shows a block diagram of a calibration system 400, including the calibration station 200 and peripheral devices. In some embodiments, peripheral devices include a spectrometer 404 and a power meter 406, which are positioned in the optical path of the light 222 that is redirected by the beam splitter 216. In some embodiments, the peripheral devices include an integrating sphere 408 to measure the total power (flux) of the light 222 that is redirected by the beam splitter 216. The measurements of color uniformity and intensity taken at the spectrometer 404, integrating sphere 408, and power meter 406 are communicated to the calibration processor 312 associated with the processing system 300 and configured to determine calibration parameters for the specific HMD 100 being analyzed at the calibration station 200. In addition, images captured by camera 206 are transmitted to the calibration processor 312 for measurement and analysis. Thus, the calibration processor 312 is communicatively coupled to the camera 206, measurement devices, such as the spectrometer 404 and power meter 406, as well as the AP processor 130.

Figure 5:
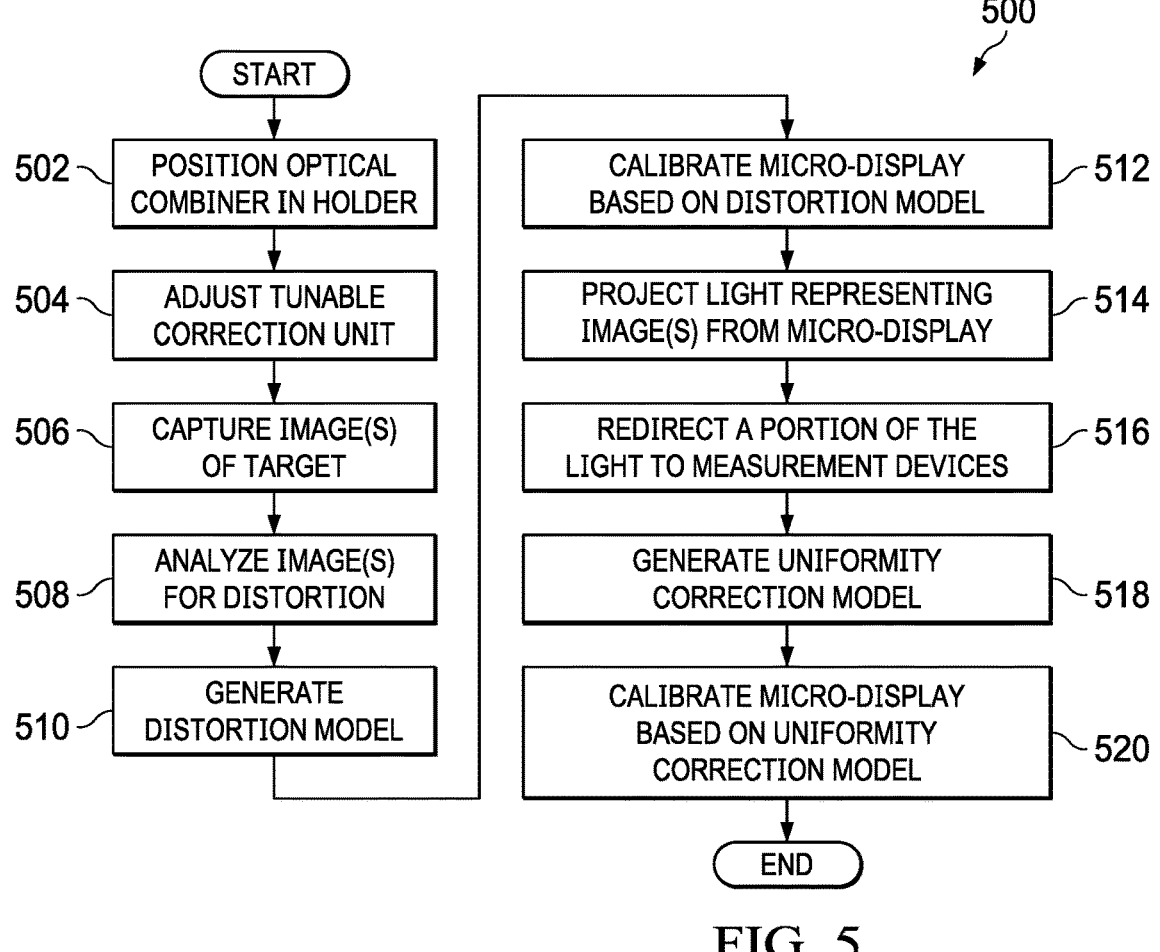
FIG. 5 illustrates a method of calibrating an HMD, such as the HMD of FIG. 1, using the calibration system of FIG. 4.

FIG. 5 illustrates a method 500 of calibrating an HMD, such as HMD 100, using the calibration system 400. At block 502, an optical combiner 102 is positioned in the holder 202 of the calibration station 200. Typically, the optical combiner 102 will be attached to a frame, such as frame 106 housing micro-display 204 and other HMD components, such as the display controller 322 and AP 302. The tunable correction unit 208 is adjusted, at block 504, to correct defocus caused by any corrective prescription included in the optical combiner 102. For example, if an optical combiner is configured to provide a +4 spherical correction, the tunable correction unit 208 is adjusted to compensate for the defocus that would be seen by the camera 206 by providing a −4 spherical correction. Thus, camera 206 and tunable correction unit 208 act together to simulate a user's eye that requires +4 spherical correction. The tunable correction unit 208 can be adjusted manually by an operator or automatically during the calibration process.

At block 506, camera 206 captures images of a reference target, such as reference target 224, as viewed through the tunable correction unit 208 and the optical combiner 102. The tunable correction unit 208 acts to correct for defocus of the reference target 224 introduced by the corrective prescription of the optical combiner 102, as described above with reference to FIG. 2, however, in some cases some distortion of the reference target 224 will still be present in the captured images. In some embodiments, this distortion is desired in the final calibrated HMD because users requiring refractive correction adapt to viewing the world with this distortion. Thus, the final display calibration should match the user's expectation in viewing their environment. At block 508, the captured images of reference target 224 are sent to the calibration processor 312, where they are measured and analyzed for distortion. At block 510, a distortion model is generated. The distortion model is provided to the AP processor 302 of the HMD in order to calibrate the micro-display 204, at block 512, to project images that have the same geometrical distortion as the captured images of the reference target 224.

Once the distortion is provided to the AP processor 302, at block 514, the micro-display 204 provides light repre- senting an image or text to the optical combiner 102, which outputs light 220 along the primary optical path between the optical combiner 102 and the camera 206 of the calibration station 200. At block 516, a portion of the output light is redirected away from the primary optical path by the beam splitter 216 and towards measurement devices of the cali- bration station 200, such as the spectrometer 404 and power meter 406, where the light is analyzed for uniformity of color and brightness. A uniformity correction model is generated at block 518 and provided to the AP processor 302 at block 520. The uniformity correction model is applied to the light 220 projected by the micro-display 204 to com- pensate for non-uniformities in the light output by the optical combiner 102 and to match a predetermined target white point. In some embodiments, the method of calibra- tion described in blocks 502 through 520 is repeated for a second lens of the HMD 100, in the case of a binocular HMD. The result is an HMD 100 which is optimally calibrated for a user's eye(s) that require refractive correc- tion.

In some embodiments, certain aspects of the techniques described above may be implemented by one or more processors of a processing system executing software. The software comprises one or more sets of executable instruc- tions stored or otherwise tangibly embodied on a non- transitory computer-readable storage medium. The software can include the instructions and certain data that, when executed by the one or more processors, manipulate the one or more processors to perform one or more aspects of the techniques described above. The non-transitory computer- readable storage medium can include, for example, a mag- netic or optical disk storage device, solid state storage devices such as Flash memory, a cache, random access memory (RAM), or other non-volatile memory device or devices, and the like. The executable instructions stored on the non-transitory computer-readable storage medium may be in source code, assembly language code, object code, or other instruction format that is interpreted or otherwise executable by one or more processors.

A computer-readable storage medium may include any storage medium, or combination of storage media, acces- sible by a computer system during use to provide instruc- tions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read- only memory (ROM) or Flash memory), or microelectro- mechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodi- ments. However, the benefits, advantages, solutions to prob- lems, and any feature(s) that may cause any benefit, advan- tage, or solution to occur or become more pronounced are not to be construed as a critical, required, or essential feature of any or all the claims. Moreover, the particular embodi- ments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
   a holder to secure an optical combiner of a head-mounted display (HMD) in an optical path between a micro- display of the HMD and a camera, wherein the micro- display is configured to project light; and
   a tunable correction unit disposed in the optical path and configured to adjust focus of light transmitted by the optical combiner; and
   wherein the camera is configured to capture at least one image of the adjusted focus light output from the tunable correction unit, and wherein the micro-display is configured to be calibrated to project light to the optical combiner based on the at least one image captured by the camera.

2. The apparatus of claim 1, wherein the optical combiner includes an integrated corrective prescription.

3. The apparatus of claim 1, wherein the tunable correc- tion unit is a phoropter comprising at least one of: a spherical lens, a cylindrical lens, a filtered lens, and a prismatic lens.

4. The apparatus of claim 1, further comprising:
   at least one optical relay disposed in the optical path between the micro-display and the camera.

5. The apparatus of claim 1, further comprising:
   a beam splitter disposed between the micro-display and the tunable correction unit and configured to redirect a portion of light from the micro-display towards at least one measurement device.

6. The apparatus of claim 5, wherein the at least one measurement device comprises at least one of a spectrom- eter and a power meter.

7. A method of calibrating a head-mounted display (HMD) comprising:
   positioning an optical combiner of the HMD into a holder of a calibration station such that the optical combiner is in a primary optical path of light projected from a micro-display of the HMD and a camera of the cali- bration station;

adjusting a tunable correction unit to correct defocus caused by a corrective prescription of the optical combiner;

capturing images of a reference target by the camera as viewed through the tunable correction unit and optical combiner; and generating a distortion model from the captured images and calibrating the micro-display to apply the distortion model to images projected by the micro-display to the optical combiner.

8. The method of claim 7, wherein the tunable correction unit is a phoropter.

9. The method of claim 7, wherein the tunable correction unit is a tunable lens.

10. The method of claim 7, further comprising:

diverting a portion of the light provided by the micro-display of the HMD away from the primary optical path to at least one measurement device.

11. The method of claim 10, wherein the at least one measurement device is at least one of a spectrometer and a power meter.

12. The method of claim 10, wherein the portion of light is diverted by a beam splitter disposed between the micro-display and the tunable correction unit.

13. The method of claim 10, further comprising:

generating a uniformity correction model and calibrating the HMD to apply the uniformity correction model to images projected by the HMD.

14. A system comprising:

a calibration station configured to secure an optical combiner of a head-mounted display (HMD) in an optical path between a micro-display of the HMD and a camera, wherein the calibration station includes a tunable correction unit disposed in the optical path and configured to be adjusted to correct defocus of light caused by the optical combiner, and wherein the camera is configured to capture at least one image of the corrected light output from the tunable correction unit to be used in calibrating the micro-display; and a calibration processor configured to receive the at least one captured image and generate a distortion model based on the at least one captured image, wherein the calibration processor is further configured to provide the distortion model to a display controller of the HMD to calibrate light projected from the micro-display to the optical combiner.

15. The system of claim 14, wherein the optical combiner includes an integrated corrective prescription.

16. The system of claim 14, wherein the tunable correction unit is a phoropter comprising at least one of: a spherical lens, a cylindrical lens, a filtered lens, and a prismatic lens.

17. The system of claim 14, further comprising:

at least one optical relay disposed in the optical path between the micro-display and the camera.

18. The system of claim 14, further comprising:

a beam splitter disposed between the micro-display and the tunable correction unit and configured to redirect a portion of light from the micro-display towards at least one measurement device.

19. The system of claim 18, wherein the at least one measurement device comprises at least one of a spectrometer and a power meter.

20. The system of claim 14, wherein the tunable correction unit is a tunable lens.

* * * * *